Patented Aug. 19, 1952

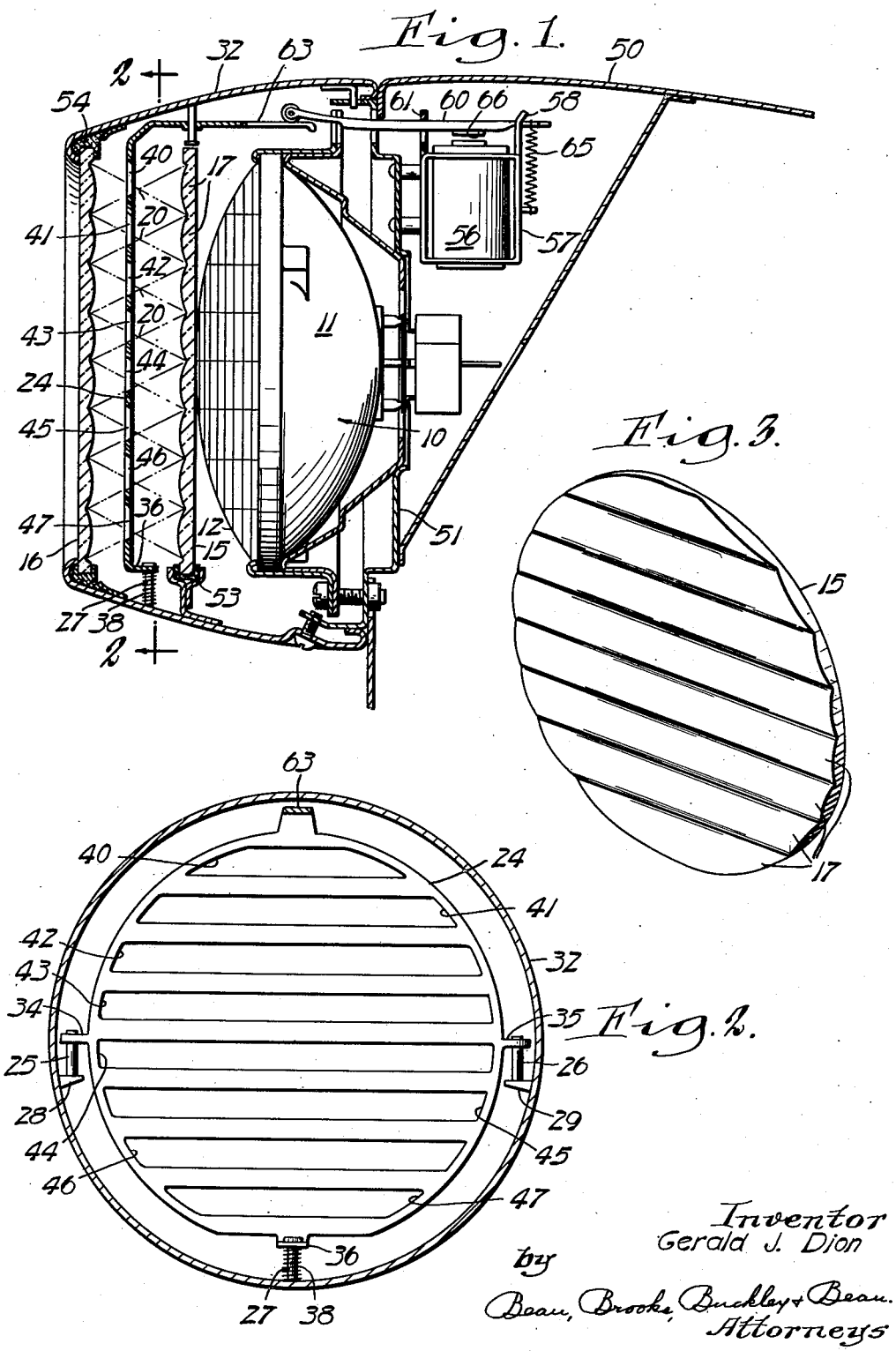

2,607,884

UNITED STATES PATENT OFFICE 2,607,884

GLARE CONTROL UNIT FOR HEADLIGHTS COMPRISING FOCAL MEANS AND REMOTELY CONTROLLED STOP PLATE

Gerald J. Dion, Buffalo, N. Y.

Application March 27, 1948, Serial No. 17,509

9 Claims. (Cl. 240—46.29)

1

This invention relates to an improved vehicular headlight.

At the present time virtually all motor vehicles are equipped at the factory with so-called "sealed-beam" headlights wherein the rear reflector portion and the front glass or lens portion are hermetically sealed to enclose suitable incandescent filaments which may be additionally enclosed in small glass bulbs or may be enclosed only by the sealed reflector and lens.

In such units the reflector is parabolic and the filaments are disposed as close as possible to the principal focus of the reflector so that, theoretically at least, all rays which pass to the reflector from the light source are projected to the front glass or lens element horizontally.

In sealed beam units, as conventionally made, the front glass elements are divided into a considerable number of rectangular elements which are arranged in rows extending both horizontally and vertically across the face of the glass. These rectangular elements comprise prisms for refracting the light rays from the reflector in a horizontal direction. Generally speaking, these prism elements are intended to leave the rays optically unaffected with respect to the vertical.

The degree of lateral refraction effected by the various prism elements is not uniform or symmetrical. The arrangement is an empirical one designed to give a pattern of illumination wherein certain parts of the pattern are more brightly illuminated than others according to a predetermined desired distribution of the available light.

By my present invention I provide means whereby a headlighting system is provided which gives forth substantially all of the light which is reflected and refracted in the theoretically desired manner but which screens out such light as is misdirected by means of various optical irregularities which are unavoidable as a matter of practical mass production.

By my present invention I provide a combination of reflecting, refracting and light screening means which affords an optimum distribution of the available light emanating from the source while, at the same time, light rays which would result in harmful glare light are obstructed in such manner as not to interfere with the general efficiency of transmission of useful light rays, which rays, at the point where the glare light rays are obstructed, have a novel focal condition which cooperates to promote the facile blocking out of the objectionable rays which, if transmitted, would result in dangerous glare light.

2

By virtue of the novel combination herein disclosed a beam pattern of rays which are all substantially horizontal but laterally divergent, with all glare light rays which would ordinarily be projected above the horizontal eliminated, is attained. An important feature is the fact that the elimination of glare rays is accomplished, in conjunction with the focusing which provides the desired beam pattern, in such manner that a maximum of properly directed light is available within the confines of the desired beam pattern.

In the drawing:

Fig. 1 is a longitudinal cross-sectional view through a headlight embodying one form of my invention;

Fig. 2 is a cross-sectional view on the line 2—2 of Fig. 1; and

Fig. 3 is a perspective view of one of the lens elements.

Throughout the several figures of the drawing like characters of reference denote like parts and the numeral 10 designates generally a sealed beam headlight unit of the kind presently used almost universally in vehicular headlights. Such units comprise, generally speaking, a parabolic reflector 11 and a front lens element 12 which is divided vertically and horizontally into a considerable number of rectangular areas, each of which comprises an individual lateral light refracting element. An incandescent light source (not shown) is disposed at the principal focus of the parabolic reflector 11. In some cases the light source comprises a complete incandescent lamp including the usual glass bulb and in others a filament is openly disposed in the hermetic casing formed by the reflector 11 and the lens 12.

The lens 12 is outwardly convex as shown in Fig. 1 but this contour is without optical significance and the individual refracting elements which comprise the lens 12 are designed and intended merely to transmit light without any vertical deviation. Thus, rays which are reflected in a horizontal direction from reflector 11 are intended to emerge from lens 12 in a horizontal direction, albeit they are refracted laterally to produce a desired beam pattern with differing concentrations of light at different parts of the beam pattern.

Immediately forwardly of the sealed beam unit 10 is a lens element 15 and at the forward end of the structure of Fig. 1 is a similar lens element 16. These lens elements are alike in formation but preferably, although not necessarily, reversed in position as shown. The lens element 15 is shown in perspective in Fig. 3 and comprises a flat rear surface and a front surface divided into a plurality of horizontally extending zones or portions 17. Each horizontally extending zone of lens registers with one of the horizontal rows of refracting elements of the lens 12, and each horizontal zone or portion, when viewed in vertical cross-section as in Fig. 1, comprises a cylindrical lens adapted to focus all horizontal rays impinging upon the flat rear surface of lens 15 at a given focal point as at 20 in Fig. 1.

The front lens element 16 is so disposed that the principal focus of each of its horizontal extending lens portions coincides with the related principal focus of the horizontal portions or zones 17 of lens 15. By virtue of this arrangement all truly horizontal rays emanating from lens 12 of the sealed beam unit project forwardly from the front lens element 16 horizontally. Since all horizontal cross-sections through lens elements 15 and 16 present parallel front and rear surfaces, the desired lateral dispersion created by the refracting elements which comprise lens 12 is likewise unaffected by lens elements 15 and 16 and the individual light rays leaving the front surface of lens element 16 extend in the same horizontal direction as when they emanated from lens 12.

While the sealed beam unit 10 is designed to project all available useful light in a substantially horizontal direction, this theoretical result is not attainable in actual practice. Apart from optical irregularities in the reflector 11 and the lens 12, particularly the latter, some of the light radiating from the light source strikes directly against lens 12 in a radiating pattern without the benefit of correction obtained by reflection from the parabolic reflector 11. The misdirected rays emanating from lens 12 are substantially eliminated by the construction of the present invention.

The several focal points 20 all lie in a common vertical focal plane which in the illustrated instance lies midway between the lens elements 15 and 16. At such plane I provide a cutoff plate 24 which may be variously arranged but which, by way of illustrating a fully operative construction, may comprise an opaque preferably non-reflective member whose rear surface lies, as precisely as is practicable, in the focal plane defined by the several foci 20.

Plate 24 is mounted for vertical movement by means of stationary pins 25, 26, and 27. Pins 25 and 26 are fixed to lugs 28 and 29 projecting from the interior of a generally annular casing 32 and pin 27 may be fixed directly to casing 32. Pins 25, 26, and 27 project slidably through ears 34, 35, and 36, respectively, formed at the margins of plate 24 and the latter may be biased to the upper position illustrated in Figs. 1 and 2 by a compression coil spring 38 which acts between the bottom of casing 32 and ear 36.

Plate 24 is provided with a vertical series of horizontal slots 40 through 47 each of which has its lower edge coincident with its related focus 20 at the rear face of plate 24. In the illustrated instance such lower edge is beveled forwardly so that the rear edge of the slot provides a sharp cutoff directly beneath the focus 20.

The physical construction of the headlight housing and support is generally conventional and is of no special importance in practicing the present invention. In Fig. 1 the numeral 50 designates the forward portion of the front fender of a vehicle where headlights are usually located and the numeral 51 designates a headlight housing and support of generally conventional construction. The manner in which the sealed beam unit 10 is associated therewith is likewise entirely conventional and the annular casing 32 may be substituted for the usual escutcheon plate or trim ring which conventionally surrounds the sealed beam unit and encloses the beam adjusting means of the headlight. Annular casing 32, in addition to movably supporting stop plate 24, supports lens elements 15 and 16 as at 53 and 54, respectively.

Under some conditions it may be desirable to render plate 24 ineffective whereby to permit even the poorly focused rays to emerge from the device, such as in conditions of extreme darkness. To this end means are provided for selectively shifting plate 24 downwardly against the resistance of spring 27, preferably to a degree where the horizontal center lines of slots 40 through 47 are approximately in registry with the several foci 20. Such means may comprise an electromagnet 56 which, in Fig. 1, is shown secured to the headlight housing 51 by means of a bracket 57.

A portion of bracket 57 extends upwardly as at 58 in Fig. 1 and is perforated to receive the rear end of an operating arm 60. The medial portion of operating arm 60 extends through an opening in a further upward extension 61 of bracket 57 to be guided thereby and the forward end of arm 60 engages against the upper side of a rearward extension 63 provided at the upper part of stop plate 24.

Arm 60 is normally held in a non-operating position by virtue of an extension coil spring 65 which engages between bracket 57 and the rear end of arm 60 to pivot the latter in a clockwise direction. Arm 60 is provided with an armature 66 which moves toward the core of electromagnet 56 when the latter is energized and thus presses downwardly against extension 53 of stop plate 24 to shift the latter to non-operating position.

While a specific embodiment of the principles of my invention are shown and described herein by way of example, it is to be understood that scope of the invention is not limited otherwise than as defined in the appended claims.

What is claimed is:

1. A vehicle headlighting system comprising a sealed beam unit including a parabolic reflector having a light source substantially at its principal focus and a lens forwardly thereof, said lens being divided into a plurality of parallel horizontal rows of prismatic elements, said prismatic elements being adapted to pass light rays substantially unaffected as to the vertical but being adapted to disperse the rays passing therethrough laterally at various angles to produce a predetermined lateral pattern of light distribution, a pair of spaced lenses forwardly of said sealed beam unit, each of said lenses being divided into horizontal zones coinciding with the horizontal rows of prismatic elements, each zone having its horizontal sides parallel and arcuate curvature in vertical cross-section with the principal foci of the several arcuate portions of both lenses located in a common plane between the lens elements, whereby the pair of lenses pass light unaffected laterally but focus the rays passing through each zone along horizontal lines between each related pair of said zones, and a stop plate for each zone having a horizontal upper edge disposed immediately beneath said focal line.

2. A vehicle headlighting system comprising a sealed beam unit including a parabolic reflector having a light source substantially at its principal focus and a lens forwardly thereof, said lens being divided into a plurality of parallel horizontal rows of prismatic elements, said prismatic elements being adapted to pass light rays substantially unaffected as to the vertical but being adapted to disperse the rays passing therethrough laterally at various angles to produce a predetermined lateral pattern of light distribution, a pair of spaced lenses forwardly of said sealed beam unit, each of said lenses being divided into horizontal zones coinciding with the horizontal rows of prismatic elements, each zone having its horizontal sides parallel and arcuate curvature in vertical cross-section with the principal foci of the several arcuate portions of both lenses located in a common plane between the lens elements, whereby the pair of lenses pass light unaffected laterally but focus the rays passing through each zone along horizontal lines between each related pair of said zones, a stop plate for each zone having a horizontal upper edge disposed immediately beneath said focal line, and means for moving said stop plates downwardly to inoperative position.

3. A vehicle headlighting system comprising a sealed beam unit including a parabolic reflector having a light source substantially at its principal focus and a lens forwardly thereof, said lens being divided into a plurality of parallel horizontal rows of prismatic elements, said prismatic elements being adapted to pass light rays substantially unaffected as to the vertical but being adapted to disperse the rays passing therethrough laterally at various angles to produce a predetermined lateral pattern of light distribution, a pair of spaced lenses forwardly of said sealed beam unit, each of said lenses being divided into horizontal zones coinciding with the horizontal rows of prismatic elements, each zone having light-converging curvature in vertical cross-section and optically neutral cross-section horizontally with the principal foci of the light converging portions of both lenses lying in a common plane between the lens elements, whereby the pair of lenses pass light unaffected laterally but focus the rays passing through each zone along horizontal lines between each related pair of said zones, and a stop plate for each zone having a horizontal upper edge disposed immediately beneath said focal line.

4. A vehicle headlighting system comprising a sealed beam unit including a parabolic reflector having a light source substantially at its principal focus and a lens forwardly thereof, said lens being divided into a plurality of parallel horizontal rows of prismatic elements, said prismatic elements being adapted to pass light rays substantially unaffected as to the vertical but being adapted to disperse the rays passing therethrough laterally at various angles to produce a predetermined lateral pattern of light distribution, a pair of spaced lenses forwardly of said sealed beam unit, each of said lenses being divided into horizontal zones coinciding with the horizontal rows of prismatic elements, each zone having light-converging curvature in vertical cross-section and optically neutral cross-section horizontally with the principal foci of the light-converging portions of both lenses lying in a common plane between the lens elements, whereby the pair of lenses pass light unaffected laterally but focus the rays passing through each zone along horizontal lines between each related pair of said zones, a stop plate for each zone having a horizontal upper edge disposed immediately beneath said focal line, and remotely operable means for moving said stop plates to inoperative positions.

5. A vehicle headlighting system comprising a sealed beam unit including a light source and a reflector-lens combination adapted to project light rays substantially horizontally forwardly in a predetermined pattern of lateral dispersion, a pair of converging lenses of substantially equal height forwardly of said sealed beam unit having their principal foci coincident in a vertical plane lying between said pair of lenses, whereby light rays from said sealed beam unit are refracted through a horizontal focal line in said plane, and a stop plate having a horizontal upper edge disposed immediately beneath said focal line.

6. A vehicle headlighting system comprising a sealed beam unit including a light source and a reflector-lens combination adapted to project light rays substantially horizontally forwardly in a predetermined pattern of lateral dispersion, a pair of cylindrical lenses of substantially equal height forwardly of said sealed beam unit having their principal foci coincident in a vertical plane lying between said pair of lenses, whereby light rays from said sealed beam unit are refracted through a horizontal focal line in said plane, a stop plate having a horizontal upper edge disposed immediately beneath said focal line, and means for moving said stop plate downwardly to inoperative position.

7. A vehicle headlighting system comprising a parabolic reflector, a light source at the focus thereof, a lens element beyond said light source, said lens element having parallel surfaces as viewed in vertical cross-section whereby light passing therethrough is not refracted vertically, said lens element having refractive formations for diverging the rays emerging therefrom in a horizontal direction, and a cylindrical lens element beyond said first lens element whereby rays are directed toward a focal plane wherein the rays are dispersed along a horizontal line at the focal plane, a second cylindrical lens of substantially the same height as the first mentioned cylindrical lens and disposed ahead of said focal plane with its principal focus in said plane, and a stop at said plane for preventing rays from passing said plane at any point below said horizontal line.

8. A vehicle headlighting system comprising a parabolic reflector, a light source at the focus thereof, a lens element beyond said light source, said lens element having parallel surfaces as viewed in vertical cross-section whereby light passing therethrough is not refracted vertically, said lens element being contoured to diverge rays emerging therefrom in a horizontal direction, and a converging lens element beyond said first lens element whereby rays are directed toward a focal plane wherein the rays are dispersed along a horizontal line at the focal plane, a second converging lens element of substantially the same height as the first converging lens element and disposed ahead of said focal plane with its principal focus substantially at said plane, and a stop at said plane for preventing rays from passing said plane at any point below said horizontal line.

9. A vehicle headlighting system comprising a light source, a reflector therebehind, and lens means forwardly thereof, said reflector and said lens means being shaped to reflect and focus rays from said light source through a substantially horizontal transverse line forwardly of said lens means, said rays being dispersed laterally along said line by said lens means, other lens means coinciding in vertical extent with the first lens means and disposed forwardly of said horizontal focal line and having its principal focus at said line, and a wall at the plane of said focal line, said wall having its top edge immediately beneath said focal line.

GERALD J. DION.

REFERENCES CITED

The following references are of record in the file of this patent:

UNITED STATES PATENTS

| Number | Name | Date |
| --- | --- | --- |
| 1,389,291 | Bone | Aug. 30, 1921 |
| 1,453,501 | Hash | May 1, 1923 |
| 1,686,525 | House | Oct. 9, 1928 |
| 2,119,370 | Van Leunen | May 31, 1938 |
| 2,277,563 | Scott et al. | Mar. 24, 1942 |